(12) United States Patent
Foumani

(10) Patent No.: US 8,086,997 B2
(45) Date of Patent: Dec. 27, 2011

(54) DETECTING ASPECTUAL BEHAVIOR IN UNIFIED MODELING LANGUAGE ARTIFACTS

(75) Inventor: Amir Abdollahi Foumani, Kirkland (CA)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 11/955,097

(22) Filed: Dec. 12, 2007

(65) Prior Publication Data

US 2009/0158244 A1    Jun. 18, 2009

(51) Int. Cl.
*G06F 9/44* (2006.01)
(52) U.S. Cl. .................................. 717/105
(58) Field of Classification Search ............ 717/105
See application file for complete search history.

(56) References Cited

OTHER PUBLICATIONS

Yang, et al., Aspect-Oriented Software Reverse Engineering, Journal of Shanghai University (English Edition), pp. 402-408 (2006).*
Kellens et al., A Survey of Aspect Mining Tools and Techniques, AspectLab (Jun. 30, 2005).*
Tourwe, et al., Mining Aspectual Views using Formal Concept Analysis, Proceddings of the 4th IEEE International Workshop on Source Code Analysis and Manipulation (Sep. 2004).*
Breu, et al., Aspect Mining Using Event Traces, Proceedings of the 19th International Conference on Automated Software Engineering (2004).*
Foumani, "Detecting Aspectual Behavior in UML Interaction Diagrams", Proceedings of the 2nd International Conference on software and Data technolgies (ICSOFT), Jul. 22-24, 2007, Barcelona Spain, pp. 1-6.
Griswold et al., "Modular Software Design with Crosscutting Interfaces", Jan./Feb. 2006, IEEE Software, pp. 51-60.

\* cited by examiner

*Primary Examiner* — Wei Zhen
*Assistant Examiner* — Kevin Dothager
(74) *Attorney, Agent, or Firm* — Yee & Associates, P.C.; David A. Mims, Jr.

(57) ABSTRACT

Illustrative embodiments disclose detecting aspectual behavior in unified modeling language artifacts. A computer represents static and dynamic properties of the unified modeling language artifacts in a set of production rules. The computer also creates a set of bit representations of method invocations found in the set of production rules and determines whether common sub-sequences exist in the set of bit representations. The computer identifies a set of aspects within the production rules responsive to a determination that the common sub-sequences exist. Finally, the computer modifies the unified modeling language artifacts.

20 Claims, 5 Drawing Sheets

DETECTING ASPECTUAL BEHAVIOR IN UNIFIED MODELING LANGUAGE ARTIFACTS

BACKGROUND OF THE INVENTION

1. Field of the Invention

The present invention relates generally to an improved data processing system, and in particular to a computer implemented method, an apparatus and a computer program product for detecting aspectual behavior in unified modeling language artifacts.

2. Description of the Related Art

In the current practice of software design within the field of software engineering, the Unified Modeling Language (UML) is a standardized specification language for object modeling. Unified Modeling Language is a general-purpose modeling language that may be used to create an abstract model of a system. The Unified Modeling Language specification is defined and managed by the Object Management Group (OMG) within the scope of a Unified Modeling Language meta-model, using a Meta-Object Facility meta-model (MOF). As with other Meta-Object Facility based specifications, the Unified Modeling Language meta-model and Unified Modeling Language models produced in accordance with the specification may be serialized in Extensible Markup Language (XML). Unified Modeling Language was designed to provide software designers with a capability to design, build, and document complex computer software systems. Unified Modeling Language is not restricted to the field of modeling software and may also be used for business process modeling as an aid to eventual application development.

During software development, developers typically strive to produce a clean implementation for efficient operation and maintenance. To meet these objectives, the design artifacts themselves, in turn, explicitly address crosscutting concerns. Design artifacts include, for example, data structure representations in the form of unified modeling language interaction diagrams and class diagrams.

Crosscutting concerns are aspects of a program which affect other concerns in the program to effectively cut across the breadth of the application. These concerns typically cannot be decomposed in an easy or clear separation from the rest of the application or system during the design and implementation phases. In the absence of a clear separation, the result is typically a scattering of similar code or tangling of components within the application, or some combination of both.

For instance, during the creation of a health care application involving the creation and management of patient records, the normal maintenance of the patient records would be perceived as a core function. In contrast, for example, the logging of transaction updates to the patient database would be viewed as a cross-cutting concern since, the functions of logging cross many paths within the application. In another example, a login authentication system providing the function of authentication may also cross cut many other functions of the application.

Although, a number of techniques have addressed aspect mining by focusing on source code examination or execution trace analysis, aspect mining at stages earlier to implementation has mainly focused on the requirements stage in the form of early aspects. Therefore it would be advantageous to have a computer implemented method, an apparatus and a computer program product for detecting aspectual behavior in unified modeling language artifacts in a manner that overcomes the previously discussed problems.

SUMMARY OF THE INVENTION

Embodiments of the inventions disclose detecting aspectual behavior in unified modeling language artifacts. A computer represents static and dynamic properties of the unified modeling language artifacts in a set of production rules. The computer also creates a set of bit representations of method invocations found in the set of production rules and determines whether common sub-sequences exist in the set of bit representations. The computer identifies a set of aspects within the production rules responsive to a determination that the common sub-sequences exist. Finally, the computer modifies the unified modeling language artifacts.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
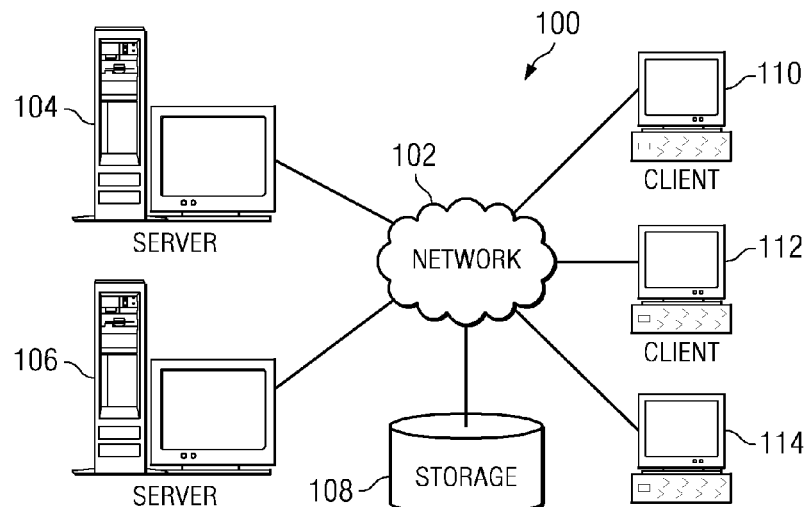
FIG. 1 is a pictorial representation of a network of data processing systems in which illustrative embodiments may be implemented.
Figure 2:
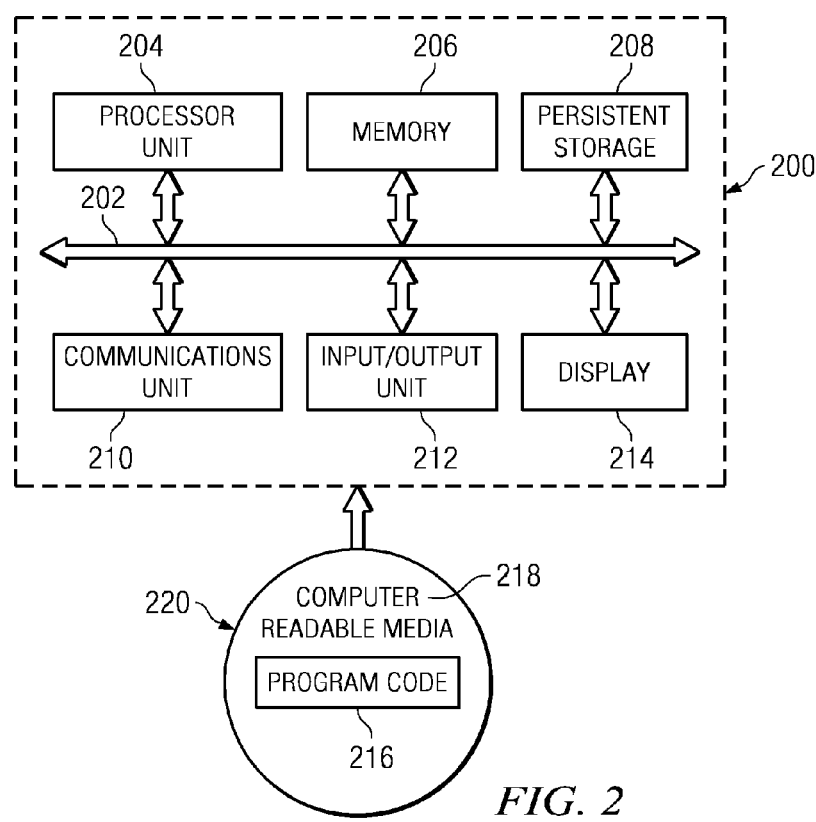
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Illustrative embodiments provide a capability for more efficient application program design of complex computer software applications. For example, in a network system, such as network system 100 of FIG. 1, applications may reside on servers 104 and 106 for use through network 102 by users on clients 110-114. The complex interaction of transactions and processes in this multiple component scenario would typically benefit from a clean design. A clean design would increase the likelihood of an efficient implementation by reducing the creation of redundant code or poor design placement of application code with respect to associated data used by that code.

For example, illustrative embodiments provide a capability to model the static and dynamic behavior of a design model given a collection of unified modeling language interaction diagrams, and proceed through a series of steps to detect "horizontal" and "vertical" aspects associated with identified crosscutting issues. The identified crosscutting issues may be re-worked or eliminated and the model redefined. Crosscutting issues not addressed during design typically lead to inefficient implementations.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

For example, illustrative embodiments enable modeling of both static and dynamic behavior of an application. In the process of illustrative embodiments, a design model is defined using a collection of unified modeling language interaction diagrams and class diagrams or statements. Through a series of steps in the process, existing "horizontal" and "vertical" aspects associated with identified crosscutting issues may be identified. An aspect is a feature that may be used or linked in many places within the application but the aspect is not the core function of the application.

A vertical aspect is characterized by the passing of messages between objects, as seen in a collection of unified modeling language diagrams, over a single level of interaction. For example, a vertical aspect may be seen in the interactions within a session such as an assignment of resources. A horizontal aspect is characterized by the use of the feature across many interactions, such as a task that is used in many parts of the application.

A crosscutting concern is a problem or issue that is common across layers and subsystems. For example, logging, security, persistence, and caching are typical areas where cross-cutting issues are found. Crosscutting issues not addressed during design typically lead to more complex and inefficient implementations. Once identified, the crosscutting items may then be re-worked or eliminated and the model further redefined.

Figure 3:
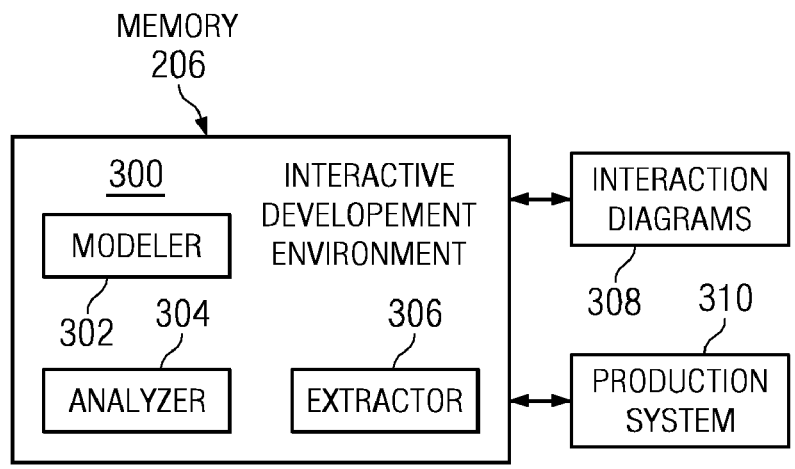
FIG. 3 is a block diagram of a portion of an aspectual behavior modeling environment, in accordance with illustrative embodiments.

With reference to FIG. 3, a block diagram of a portion of an aspectual behavior modeling environment in accordance with illustrative embodiments is shown. A portion of an aspectual behavior modeling environment is shown as interactive development environment 300 within memory 206 of FIG. 2. Other portions of interactive development environment 300 necessary for the function of the environment are known and not presented. An overview of the process used comprises receiving unified modeling language interaction diagram input, processing the input, and creating modified interaction diagrams as output. The process will analyze the interaction diagrams for static and dynamic properties.

Modeler 302 provides a capability to create the output in the form of interaction diagrams that may be used by other components as required in accordance with unified modeling language specifications. Modeler 302 generates new interaction diagrams subject to modification as a result of the crosscutting analysis performed.

Analyzer 304 consumes the information in the interaction diagrams received as input to detect the aspect behavior contained within the interaction diagrams. Analyzer 304 will represent the static and dynamic behavior defined in the unified modeling language interaction diagrams as a set of production rules. The static model may be derived from a set of class diagrams and the dynamic model derived from the interaction diagrams. A bit representation of the method invocations, for each method of each class, found in the interaction diagrams and defined in the production rules, is created. Common sub-sequences are then detected to define the aspect behavior. A common sub-sequence is a repeated use of a feature or function. For example, a task used to assign resources within a session is a typical sub-sequence of a session routine. From the aspect behavior, a determination of the type of aspect behavior and the location is made.

Extractor 306 provides a capability to pull information out of interaction diagrams 308 for use by analyzer 304. In addition, extractor 306 can also extract production rules given associated application source code as input. Interaction diagrams 308 are artifacts as defined for use within the context of the unified modeling language specification.

Production system 310 is a set of definitions describing a real world system that is to be modeled. Using object definitions and relationships a developer may model and visualize a real world system. The semantics and metadata behind the model can be represented as a set of abstract rules that form the set of production rules of the production system.

Figure 4:
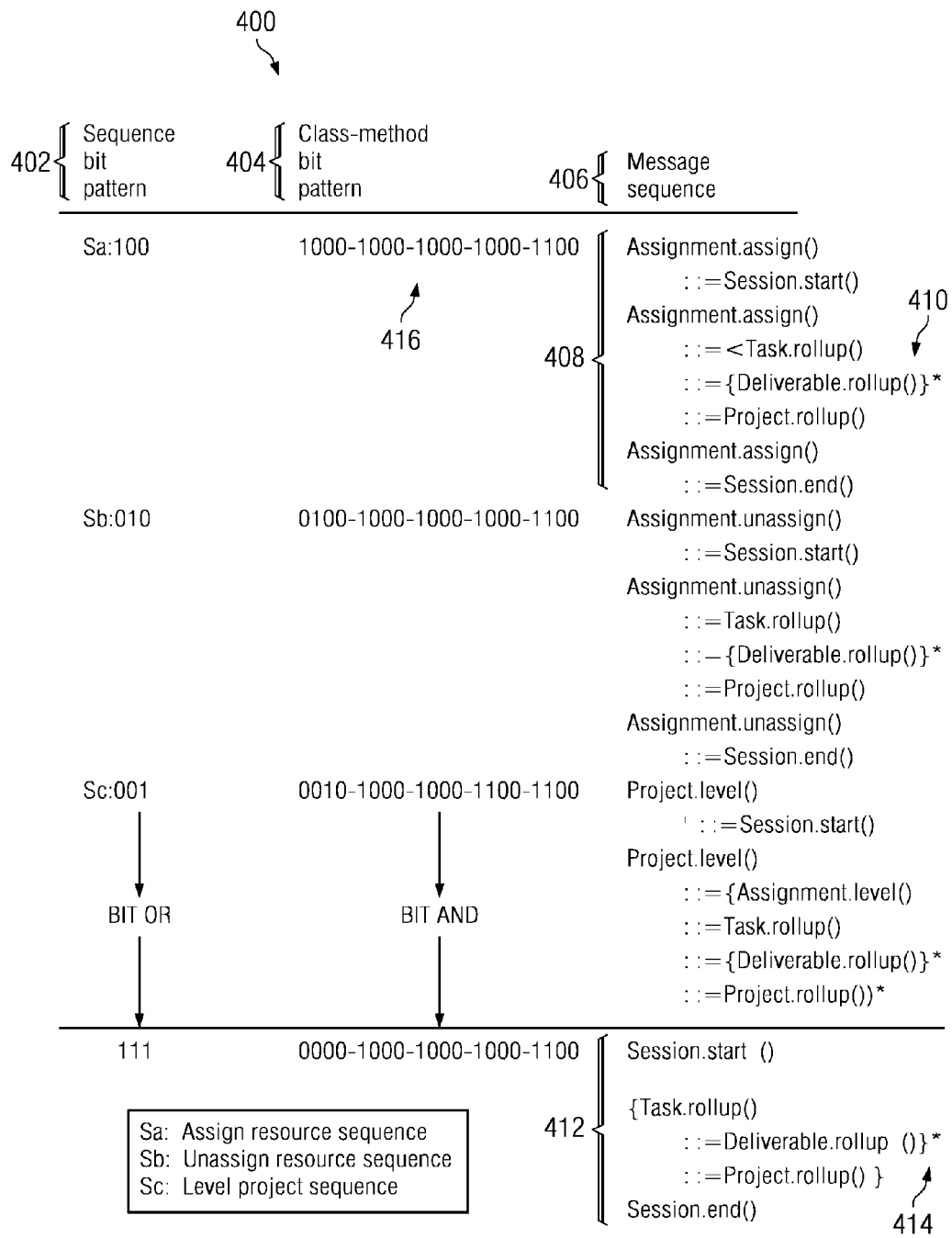
FIG. 4 depicts an example of detection analysis for aspectual behavior in unified modeling language artifacts, in accordance with illustrative embodiments.

With reference to FIG. 4, an example of detection analysis for aspectual behavior in unified modeling language artifacts in accordance with illustrative embodiments is shown. Detection analysis 400 presents, in a tabular form, the result of an exemplary analysis, such as that typically performed by analyzer 304 of FIG. 3. Sequence bit pattern 402 represents the occurrence of a particular operation or event within the code of interest. Class-method bit pattern 404 represents the class-method pairing bit pattern representation of method invocations for each class of the system. A bit is reserved for each method of each class in the system. In this example, four bits are allocated for each class implying that each class is not expected to have more than four methods. A string or pattern forming a bit representation of a message sequence is built by joining these four bit sequences: Allocation is then made of the first four bits to Assignment Class, the next four bits to Task class and similarly to classes Deliverable, Project, and Session. Message sequence 406 indicates the order in which the message is performed. In the example, three sequences are seen; assign (a), un-assign (b), and level (c).

The information represented in the production system includes static, structural definitions of the properties of the system. For example, the properties typically comprise, class name, assignment, declarations and class properties. For example, in the interactive diagrams of representing a dynamic model of a scenario having assignments and project levels, the dynamic model includes usage information, such as assigning and un-assigning of resources, as well as project levels, defining relationship properties. The static and dynamic properties information is combined to produce derivation structures 408 within the message sequence 406.

The method invocations seen in derivations structures 408 are used to create class-method bit pattern sequence 416, wherein the corresponding bit of an invoked method is set to one. In addition, a bit is reserved for each message sequence. To detect a pattern of aspectual behavior, a bitwise "OR" is performed over the patterns for message sequences to find out which patterns are introduced by which message sequences and a bitwise "AND" is performed over the patterns for method invocations. The result of the bitwise "AND" operation identifies the methods that can be grouped together to form an aspect.

In the example, a bitwise "AND" is performed over Sa (Assign resource), Sb (Un-assign resource) and Sc (Project leveling). The bitwise "AND" operation will yield {0000-1000-1000-1000-1100} which represents the method invocations of Task.rollup( ), Deliverable.rollup( ), Project.rollup( ), Session.start( ) and Session.end( ). The order of the method invocations identified by bit patterns is defined by the production rules defined for the message sequences. The result of the bitwise "AND" operation illustrates that Task.rollup( ), Deliverable.rollup( ), Project.rollup( ), Session.start( ), Session.end( ) can be an aspect. The production rules illustrate that there are two different aspects: {Task.rollup( ), Deliverable.rollup( ), and Project.rollup( ) defining a horizontal aspect 414, while {Session.start( ), and Session.end( )} defines a vertical aspect 412.

Illustrative embodiments categorize the aspectual behavior into two different groups. A first group is "horizontal aspect" in which behavior is defined by sequences of message passing between objects in a collection of unified modeling language interaction diagrams over multiple levels of interaction. A second group is "vertical aspect" in which behavior is defined by sequences of message passing between objects in a collection of unified modeling language interaction diagrams over a single level of interaction.

Figure 5:
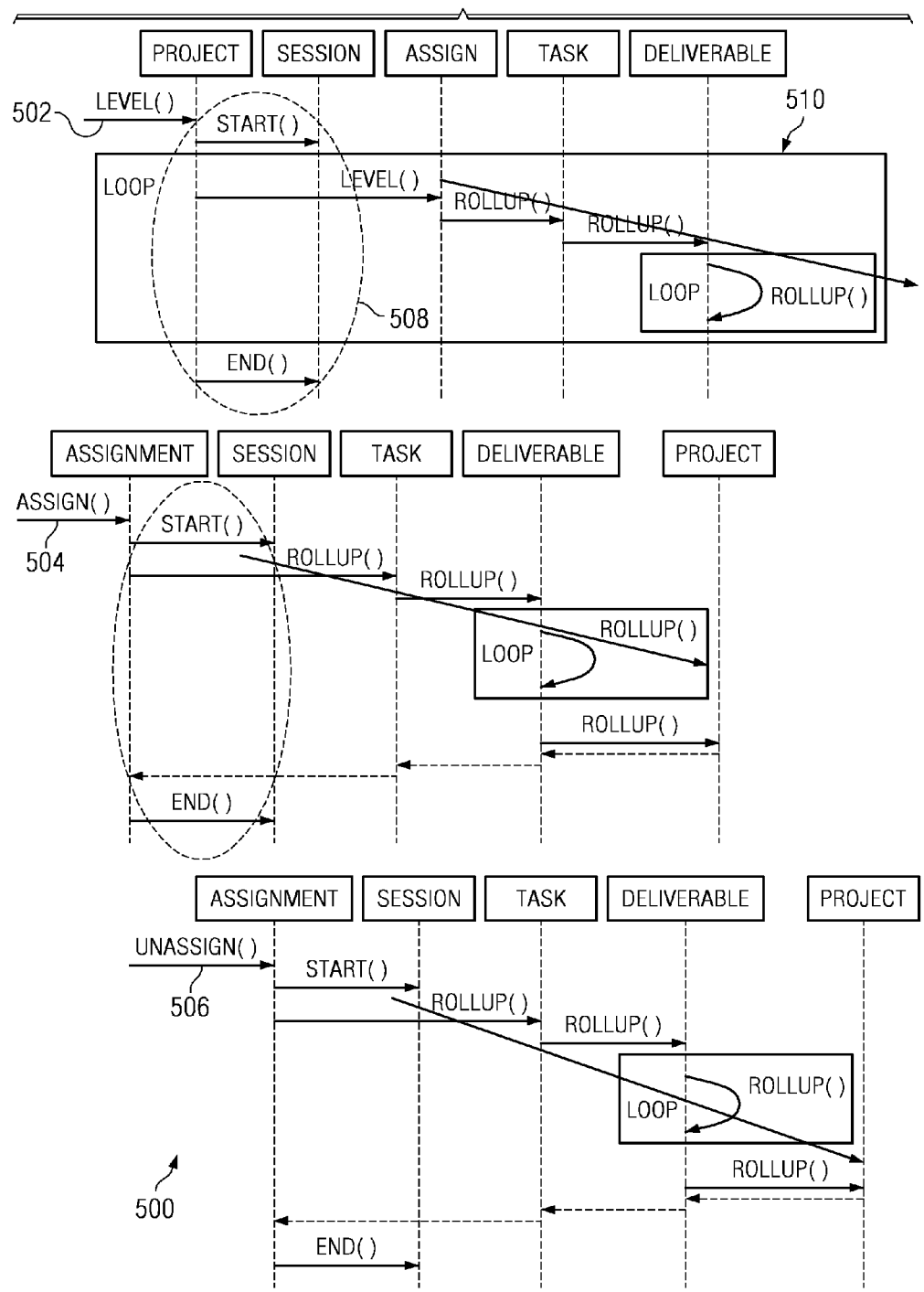
FIG. 5 is a block diagram of interaction diagrams of the assign, unassign, and level of FIG. 4, in accordance with illustrative embodiments.

FIG. 5 is a block diagram of interaction diagrams of the assign, unassign, and level of FIG. 4, in accordance with illustrative embodiments. Interaction diagrams 500 represent activities of a portion of an application, showing a relationship and flow of interaction. The flow of the interactions represents the method invocations used in the application being examined. Functional elements of level 502, assign 504, and unassign 506 are depicted illustrating the respective interactive relationships between the five major classes and method invocations. Vertical aspect 508 illustrates the combination of session start and session end methods, within the class "session." Horizontal aspect 510 illustrates the combination of task, deliverable and project rollup methods in addition to session start and session end. In this example, session start and session end methods are contained in both a horizontal and a vertical aspect, while the rollup method invocation is across a number of classes.

Figure 6:
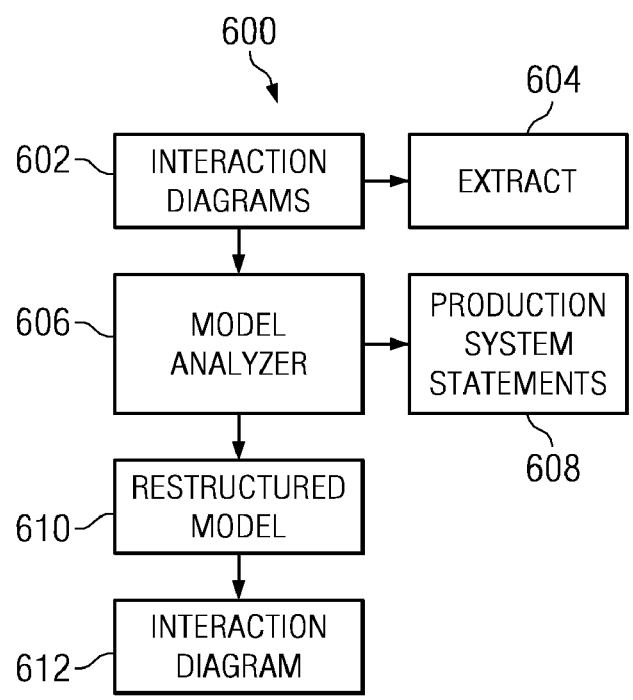
FIG. 6 is a flowchart of an overview of a process of detecting aspectual behavior in unified modeling language artifacts, in accordance with illustrative embodiments.

FIG. 6 is a flowchart of an overview of a process of detecting aspectual behavior in unified modeling language artifacts in accordance with illustrative embodiments. Process 600 is an example of a detection process of analyzer 304 of FIG. 3, in accordance with illustrative embodiments.

Interaction diagrams are received for analysis by the analyzer (step 602). An extraction is performed to pull needed information from the statements (step 604). Production system statements are created and extracted (step 608). Production system statements may be extracted to provide static system information whereas the extractions from the interaction diagrams provide dynamic information content.

Analysis of the static and dynamic information is provided by the analyzer to determine whether any crosscutting issues exist, and if so, at which locations in the content being analyzed (step 606). Having determined crosscutting issues exist, the underlying model would be refined or restructured to eliminate or reduce the issues (step 610). Revised interaction diagrams are created to reflect the change in the dynamic content after resolving issues with crosscutting (step 612).

Figure 7:
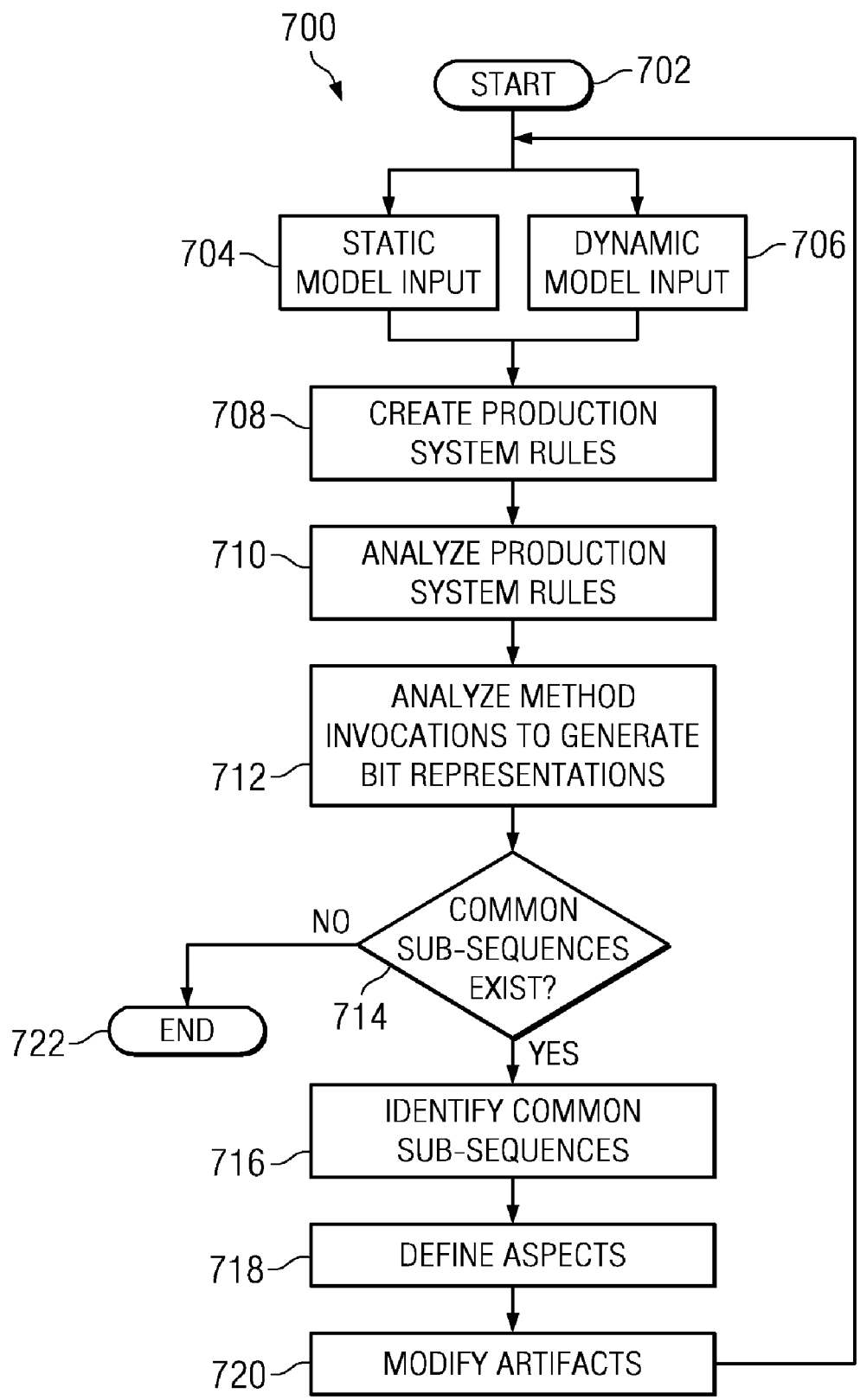
FIG. 7 is a flowchart of an analysis process of detecting aspectual behavior in unified modeling language artifacts of FIG. 6, in accordance with illustrative embodiments.

With reference to FIG. 7, a flowchart of an analysis process of detecting aspectual behavior in unified modeling language artifacts of FIG. 6, in accordance with illustrative embodiments is shown. Process 700 is an example using the process of analyzer 304, in combination with the processes of extractor 306 and modeler 302 of FIG. 3, in accordance with illustrative embodiments.

Process 700 starts (step 702) and obtains input of static model information is created from an extract of production system information (step 704). Input of dynamic information is obtained from an extract of relevant information from unified modeling language interaction diagrams (step 706). Steps 704 and 706 may be performed sequentially by an extractor such as extractor 306 of FIG. 3, with either extraction occurring before the other or in parallel. Both forms of input are combined to create production system rules having both static and dynamic information describing the properties of the system (step 708).

An analysis of the method invocations of the production system rules is performed to identify the class-method combinations (step 710). A further analysis of the method invocations is performed to create a set of bit representations representative of the pattern of invocations (step 712). A determination is made whether common method invocation sub-sequences exist within the system analyzed from analyzing the bit representations (step 714). If there are common sub-sequences, a "yes" result is obtained, otherwise a "no" results. If a "yes" result was obtained in step 714, common behavior was identified from the bit pattern representations within the sub-sequences and the sub-sequences are now identified (step 716). If no sub-sequences were determined in step 714, process 700 terminates thereafter (step 722).

Aspects are then determined and categorized or defined according to predetermined bit patterns (step 718). The aspects are categorized as either vertical, within a single interaction or horizontal when across multiple interactions. Based on the aspects found, associated artifacts are then modified in accordance with the character of the related aspect (step 720). Modification may involve eliminating the aspect, working around the aspect or defining a new functional object to reduce the issue related to the particular aspect. Process 700 returns to step 702 to further refine the model. Model refinement made typically using a modeler such as modeler 302 of FIG. 3 updating the static and dynamic content in accordance with changes based on the type of issue and category of aspect defined. For example, if a horizontal crosscut category of aspect was identified, and the aspect could not be removed, code of the aspect may be reworked or the aspect may be cached to improve performance to address the issue raised.

Thus, the illustrative embodiments provide a capability for representation of the static and dynamic behavior defined by the unified modeling language artifacts to be created in the form of production rules. Then, the method invocations found in each interaction diagram are represented by a sequence of bits. Analysis of the bit-patterns is used to determine the common sub-sequences of the overall process.

From the analysis, aspectual behavior may then be determined. Identifying the aspectual behavior through analysis of unified modeling language artifacts can also be applied to implementation artifacts by extracting production rules from source code. Using an iterative approach of analysis and detection, an application design may be further refined.

As shown in illustrative embodiments, common behavior can be captured, after analysis, using the design dimensions and the vocabulary introduced by the AspectJ programming language. For the horizontal aspect, the pointcut is a predicate over all three external messages and it can be defined as the disjunction of {Assignment.assign( )}, {Assignment.unassign( )} and {Assignment.level( )}. The advice block would be the sequence {Task.rollup( ), {Deliverable.rollup( )}*, and Project.rollup( )>}. For the vertical aspect, the pointcut can be defined as the disjunction of {Assignment.assign( )}, {Assignment.unassign( )}, and {Project.level( )}. Two different advice blocks are then introduced for starting a session and ending a session: {Session.start( )} and {Session.end( )}.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for detecting aspectual behavior in unified modeling language artifacts, the computer method comprising:
representing static and dynamic properties of the unified modeling language artifacts in a set of production rules;
creating a set of bit representations of method invocations found in the set of production rules;
determining whether common sub-sequences exist in the set of bit representations;
identifying a set of aspects within the production rules responsive to a determination that the common sub-sequences exist; and
modifying the unified modeling language artifacts.

2. The computer implemented method of claim 1, wherein representing static and dynamic characteristics further comprises:
extracting dynamic information from a set of unified modeling language interaction diagrams; and
extracting static information from a set of production system statements.

3. The computer implemented method of claim 1, wherein creating a set of bit representations further comprises:
reserving a bit for each method invocation of each class in the production rules to create a class-method pairing for each class;
joining the class-method pairing for each class in the production rules together to form a message sequence; and
reserving a bit for the message sequence.

4. The computer implemented method of claim 3, wherein detecting common sub-sequences further comprises:
performing a bitwise "OR" over a pattern defined by the message sequence; and
performing a bitwise "AND" over a pattern defined by the each method invocation.

5. The computer implemented method of claim 1, wherein identifying a set of aspects further comprises:
determining the common sub-sequences conform to predetermined patterns of defined aspect behavior to create a set of conforming sub-sequences; and
assigning an aspect behavior category to each of the set of conforming sub-sequences.

6. The computer implemented method of claim 2, wherein modifying the unified modeling language artifacts further comprises:
modifying the dynamic information in the set of unified modeling language interaction diagrams; and
modifying the static information in the set of production system statements.

7. The computer implemented method of claim 1, wherein modifying the unified modeling language artifacts further comprises:
modifying the unified modeling language artifacts in accordance with the set of aspects.

8. A data processing system for detecting aspectual behavior in unified modeling language artifacts, the data processing system comprising:
a bus;
a memory;
a communications unit connected to the bus;
a persistent storage connected to the bus, wherein the persistent storage comprising computer usable instructions tangibly embodied thereon;
a display connected to the bus;
a processor unit connected to the bus, wherein the processor unit executes the computer usable instructions to:
represent static and dynamic characteristics of the unified modeling language artifacts in a set of production rules;
create a set of bit representations of method invocations found in the set of production rules;

determine whether common sub-sequences exist in the set of bit representations;

identify a set of aspects within the production rules responsive a determination that the common sub-sequences exist; and modify the unified modeling language artifacts in accordance with the set of aspects.

9. The data processing system of claim 8, wherein the processor unit executes the computer usable instructions to represent static and dynamic characteristics further comprises:

extracting dynamic information from a set of unified modeling language interaction diagrams; and extracting static information from a set of production system statements.

10. The data processing system of claim 8, wherein the processor unit executes the computer usable instructions to create a set of bit representations further comprises:

reserving a bit for each method invocation of each class in the production rules to create a class-method pairing for each class;

joining the class-method pairing for each class in the production rules together to form a message sequence; and reserving a bit for the message sequence.

11. The data processing system of claim 10, wherein the processor unit executes the computer usable instructions to detect common sub-sequences further comprises:

performing a bitwise "OR" over a pattern defined by the message sequence; and performing a bitwise "AND" over a pattern defined by the each method invocation.

12. The data processing system of claim 8, wherein the processor unit executes the computer usable instructions to identify a set of aspects further comprises:

determining the common sub-sequences conform to predetermined patterns of defined aspect behavior to create a set of conforming sub-sequences; and assigning an aspect behavior category to each of the set of conforming sub-sequences.

13. The data processing system of claim 8, wherein the processor unit executes the computer usable instructions to modify the artifacts further comprises:

modifying the dynamic information in the set of unified modeling language interaction diagrams; and modifying the static information in the set of production system statements.

14. The data processing system of claim 8, wherein modifying the unified modeling language artifacts further comprises:

modifying the unified modeling language artifacts in accordance with the set of aspects.

15. A computer program product for detecting aspectual behavior in unified modeling language artifacts, the computer program product comprising a computer usable recordable medium having computer usable program code tangibly embodied thereon, the computer usable program code comprising:

computer usable program code for representing static and dynamic characteristics of the unified modeling language artifacts in a set of production rules;

computer usable program code for creating a set of bit representations of method invocations found in the set of production rules;

computer usable program code for determining whether common sub-sequences exist in the set of bit representations;

computer usable program code for identifying a set of aspects within the production rules responsive to a determination that the common sub-sequences exist; and computer usable program code for modifying the unified modeling language artifacts in accordance with the set of aspects.

16. The computer program product of claim 15, wherein computer usable program code for representing static and dynamic characteristics further comprises:

computer usable program code for extracting dynamic information from a set of unified modeling language interaction diagrams; and computer usable program code for extracting static information from a set of production system statements.

17. The computer program product of claim 15, wherein computer usable program code for creating a set of bit representations further comprises:

computer usable program code for reserving a bit for each method invocation of each class in the production rules to create a class-method pairing for each class;

computer usable program code for joining the class-method pairing for each class in the production rules together to form a message sequence; and computer usable program code for reserving a bit for the message sequence.

18. The computer program product of claim 17, wherein computer usable program code for detecting common sub-sequences further comprises:

computer usable program code for performing a bitwise "OR" over a pattern defined by the message sequence; and computer usable program code for performing a bitwise "AND" over a pattern defined by the each method invocation.

19. The computer program product of claim 15, wherein computer usable program code for identifying a set of aspects further comprises:

computer usable program code for determining the common sub-sequences conform to predetermined patterns of defined aspect behavior to create a set of conforming sub-sequences; and computer usable program code for assigning an aspect behavior category to each of the set of conforming sub-sequences.

20. The computer program product of claim 15, wherein computer usable program code for modifying the unified modeling language artifacts further comprises:

computer usable program code for modifying the dynamic information in the set of unified modeling language interaction diagrams;

computer usable program code for modifying the static information in the set of production system statements;

computer usable program code for modifying the unified modeling language artifacts in accordance with the set of aspects.

* * * * *